United States Patent [19]

Naruse et al.

[11] Patent Number: 5,714,281
[45] Date of Patent: Feb. 3, 1998

[54] NON-AQUEOUS LIQUID ELECTROLYTE SECONDARY CELL

[75] Inventors: Yoshiaki Naruse, Kanagawa; Shigeru Fujita, Tokyo; Atsuo Omaru, Kanagawa, all of Japan

[73] Assignee: Sony Corporation, Tokyo, Japan

[21] Appl. No.: 851,481

[22] Filed: May 5, 1997

Related U.S. Application Data

[63] Continuation of Ser. No. 508,967, Jul. 28, 1995, abandoned.

[30] Foreign Application Priority Data

Jul. 29, 1994  [JP]  Japan ................... 6-178468

[51] Int. Cl.⁶ ........................................ H01M 6/14
[52] U.S. Cl. ...................... 429/197; 429/194; 429/218
[58] Field of Search ........................ 429/194, 218, 429/197

[56] References Cited

U.S. PATENT DOCUMENTS

| | | | |
|---|---|---|---|
| 5,352,548 | 10/1994 | Fujimoto et al. | 429/194 |
| 5,385,794 | 1/1995 | Yokoyama et al. | 429/194 |

*Primary Examiner*—Bruce F. Bell
*Attorney, Agent, or Firm*—Hill, Steadman & Simpson

[57] ABSTRACT

A non-aqueous liquid electrolyte secondary cell including a cathode formed of metal lithium, a lithium alloy or a material capable of doping/undoping lithium, an anode and a non-aqueous liquid electrolyte formed by an electrolyte dissolved in a non-aqueous solvent. The non-aqueous solvent contains vinylene carbonate. The non-aqueous liquid electrolyte secondary cell may be advantageously employed as a power supply source for a small-sized lightweight portable electronic equipment.

5 Claims, 2 Drawing Sheets

NON-AQUEOUS LIQUID ELECTROLYTE SECONDARY CELL

This is a continuation of application Ser. No. 08/508,967, filed Jul. 28, 1995, now abandoned.

BACKGROUND OF THE INVENTION

This invention relates to a non-aqueous liquid electrolyte secondary cell and, more particularly, to improvement in a non-aqueous solvent employed therein.

In keeping up with the recent tendency towards reduction in size and weight and hand-portability of electronic equipments, such as a video tape recorder (VTR) with a built-in camera, telephone or a lap-top computer, an increasing demand has been raised towards reduction in size and increase in capacity of secondary cells as power supply source for these electronic equipments.

The secondary cells may be exemplified by conventional lead secondary cells or nickel-cadmium secondary cells and recently proposed non-aqueous liquid electrolyte secondary cells (lithium secondary cells). In particular, the non-aqueous liquid electrolyte secondary cells are meritorious in being lightweight, high in safety and pollution-free while being capable of developing high energy density and high voltage. For this reason, studies and researches are proceeding briskly towards further improving the characteristics of the cells.

Basically, the non-aqueous liquid electrolyte secondary cell has a cathode and an anode capable of doping/undoping lithium and a non-aqueous liquid electrolyte comprised of a lithium salt dissolved as an electrolyte in a non-liquid solvent.

An active material for an anode may be enumerated by a lithium transition metal composite oxide. An active material for a cathode may be enumerated by metal lithium, a lithium alloy and a carbonaceous material capable of doping/undoping lithium. Of these, the carbonaceous material is thought to be promising in improving cyclic characteristics of the cell. In particular, graphite is attracting attention as being a material capable of improving the energy density per unit area of the cell.

In the above-described non-aqueous liquid electrolyte secondary cell, not only the characteristics of the cathode and the anode, but also those of the non-aqueous liquid electrolyte responsible for transfer of lithium ions are crucial for realizing satisfactory characteristics of the cell.

As the non-aqueous solvent, constituting the non-aqueous liquid electrolyte, a high dielectric constant solvent having high capability for dissolving the electrolyte and a low-viscosity solvent having a high transfer capability for transferring ions of the electrolyte are usually employed in combination. For example, a propylene carbonate-based liquid electrolyte, obtained on mixing propylene carbonate (PC) as the high dielectric constant solvent, and 1,2-dimethoxyethane (DME), 2-methyl tetrahydrofuran (2-MeTHF), dimethyl carbonate (DMC), methylethyl carbonate (MEC) or diethyl carbonate (DEC), as low-viscosity solvents, has been in widespread use in that it leads to improved electrical conductivity and improved cyclic characteristics of the cell.

However, while being superior to other electrolytes proposed up to now, the PC-based liquid electrolyte is not fully satisfactory as to certain characteristics desired to be afforded to the non-aqueous liquid electrolyte.

Although attempts have been made to employ highly crystalline graphite for the cathode in expectation of elevating the energy density of the cell, PC is undesirably dissolved in the graphite. Consequently, PC is not suitable to be employed as an active material for a cathode.

Our researches have revealed that, if graphite is employed as an active material for a cathode, the liquid electrolyte may be prohibited from being decomposed by employing a solvent difficult to decompose, such as ethylene carbonate (EC), in place of PC. However, EC has a high solidifying point of 38° C. and is non-meritorious in improving low-temperature characteristics of the cell. On the other hand, with the non-aqueous liquid electrolyte secondary cell employing EC as the solvent for the liquid electrolyte suffers from poor cyclic characteristics, although the mechanism therefor has not been clarified to date.

OBJECT AND SUMMARY OF THE INVENTION

It is therefore an object of the present invention to provide a non-aqueous liquid electrolyte having high energy density and capable of developing satisfactory cyclic characteristics.

For accomplishing the above object, the present inventors have conducted various investigations, and have found that, by employing vinylene carbonate in place of propylene carbonate as a high dielectric constant solvent, graphite can be used as an active material for a cathode, thus allowing to produce a secondary cell having high energy and capable of exhibiting satisfactory cyclic performance even under a lower temperature environment.

The present invention has been realized on the basis of this finding and provides a non-aqueous liquid electrolyte secondary cell comprising a cathode formed of metal lithium, a lithium alloy or a material capable of doping/undoping lithium, an anode and a non-aqueous liquid electrolyte formed by an electrolyte dissolved in a non-aqueous solvent.

According to the present invention, a non-aqueous solvent containing vinylene carbonate is employed as the non-aqueous solvent for the liquid electrolyte of the non-aqueous liquid electrolyte secondary cell.

Vinylene carbonate is a compound having the structure shown by the following chemical formula:

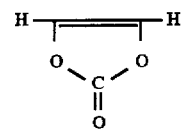

If such vinylene carbonate is employed as a non-aqueous solvent for the liquid electrolyte, satisfactory cyclic performance can be accorded to the cell. Since vinylene carbonate is not decomposed with graphite which decomposes propylene carbonate, the energy density of the cell may be improved by employing graphite having high true density as the cathode. In addition, since vinylene carbonate has a solidifying point of 22° C. which is lower than the solidifying point of EC which is near 38° C., satisfactory cyclic performance can be realized under a lower temperature environment.

The proportion of vinylene carbonate contained in the non-aqueous solvent is suitably not less than 20 vol % and not more than 80 vol %.

As other solvents mixed with vinylene carbonate, chain esters are preferred. Of these, chain carbonic acid esters, such as dimethyl carbonate, methylethyl carbonate or diethyl carbonate, are most preferred.

On the other hand, the electrode material for the anode is preferably a composite oxide containing lithium and one or more transition metals.

The electrode material for the cathode is desirably a carbon material capable of doping/undoping lithium. In particular, the energy density of the cell may be improved by employing a carbon material having a spacing on the (002) plane of not more than 0.340 nm, that is graphite.

That is, since the non-aqueous liquid electrolyte secondary cell according to the present invention employs the vinylene carbonate containing non-aqueous solvent, it becomes possible to employ graphite as an active material for a cathode and hence to achieve high energy density. On the other hands, low temperature characteristics of the cell may be improved, such that satisfactory cyclic performance can be realized under a temperature environment lower than that when EC is employed as a solvent.

The non-aqueous liquid electrolyte secondary cell may be advantageously employed as a power supply source for a small-sized lightweight portable electronic equipment.

DETAILED DESCRIPTION OF THE PREFERRED EMBODIMENT

Figure 1:
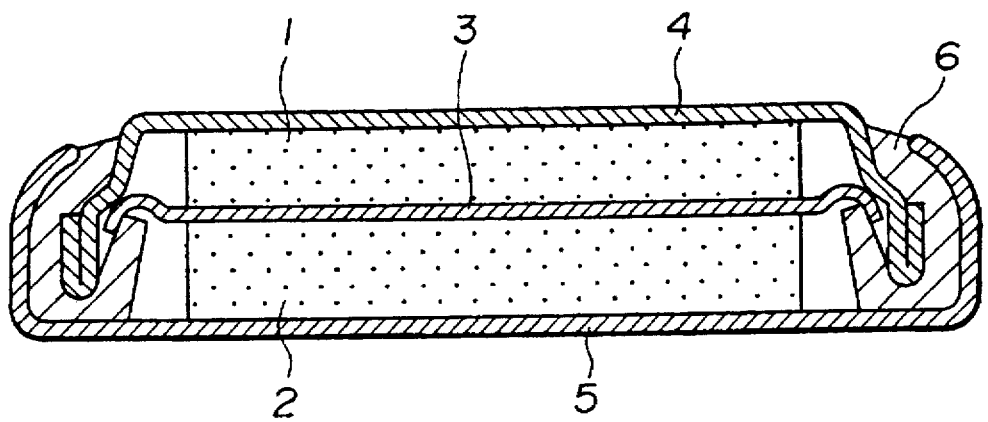
FIG. 1 is a cross-sectional view showing a coin-shaped cell employed for evaluating a non-aqueous solvent.

Specific mode of execution of the present invention will be hereinafter explained.

The non-aqueous liquid electrolyte secondary cell of the present invention is made up of a cathode formed of metal lithium, lithium alloys or a material capable of doping/undoping lithium, an anode and a non-aqueous liquid electrolyte comprised of the electrolyte dissolved in the non-aqueous solvent.

In the present invention, vinylene carbonate (VC) is employed in such non-aqueous liquid electrolyte secondary cell as a high dielectric constant solvent in place of propylene carbonate (PC).

If VC is employed as the non-aqueous solvent, superior cyclic characteristics may be afforded to the cell. In addition, since VC is not decomposed by graphite which decomposes PC, the energy density of the cell may be improved by employing graphite having high true density. Further, since VC has a solidifying point of 22° C. which is lower than the solidifying point of EC which is 38° C., superior cyclic characteristics may be achieved under a temperature environment which is lower than when employing EC.

As the non-aqueous solvent, VC may be employed alone or as a mixture with e.g., PC, ethylene carbonate (EC), γ-butyrolactone, low-viscosity solvents, such as 1,2-dimethoxyethane (DME) or 2-methyl tetrahydrofuran (2-MeTHF), or chain esters, such as dimethyl carbonate (DMC), methylethyl carbonate (MEC), diethyl carbonate (DEC), methyl propionate or methyl lactate. Of these, the chain esters are low in viscosity and suitable as a solvent employed as a mixture with VC. In particular, if esters of carbonic acid, such as DMC, MEC or DEC are used, the cell is improved in retention of capacity. If VC is admixed with other solvents, VC is desirably not less than 20 vol % and not more than 80 vol %. The cyclic characteristics of the cell may be improved by employing the VC in this volume ratio range.

There is no particular limitation to the electrolyte dissolved in the non-aqueous solvent. In particular, any of those usually employed in the non-aqueous secondary cell may be employed. Specifically, $LiClO_4$, $LiAsF_6$, $LiPF_6$, $LiBF_4$, $LiCF_3SO_3$ or $LiN(CF_3SO_2)_2$, may be employed. Of these, $LiPF_6$ and $LiBF_4$ are desirably employed.

The cathode and the anode, employed in combination with the above-mentioned non-aqueous liquid electrolyte, those usually employed with this type of the non-aqueous liquid electrolyte secondary cell may be employed.

The cathode is formed of metal lithium, lithium alloys, such as lithium-aluminum alloy, or a material capable of doping/undoping lithium. The material capable of doping/undoping lithium may be enumerated by e.g., pyrolyric carbon, cokes (such as pitch coke, needle coke or petroleum coke), graphites, vitreous carbon, sintered organic high molecular compounds, such as phenol or furan resins sintered and carbonified at suitable temperatures, carbonaceous materials, such as carbon fibers or activated charcoal, or polymers, such as polyacetylene or polypyrrol.

Of these, the carbon material is preferably employed for improving the cyclic performance. In particular, if the graphite having parameters of crystal structure including a spacing of the (002) plane of not more than 0.340 nm and, preferably, the crystallite thickness in the C-axis direction of not less than 18.0 nm, the G-value in the Raman spectrum of not less than 2.5 and true density of not less than 2.1 g/cm$^3$, is employed, the energy density per unit volume of the cell is improved. The G value means the ratio of the signal intensity derived from the graphite structure of the carbonaceous material and the signal intensity derived from the amorphous structure in the Raman spectrum and may be used as an index for defects in the microscopic crystalline structure.

For improving the cell capacity and increasing the energy density, an active material mainly composed of a composite oxide of lithium and one or more transition metal (lithium-transition metal composite oxide) is preferably employed for the anode. For example, an active material mainly composed of the lithium-transition metal composite oxide represented by the formula $Li_xO_2$, where M denotes one or more transition metal and X is a value which differs with the charging/discharging state of the cell and is usually in a range of $0.05 \leq x \leq 1.10$, is preferred. In $Li_xO_2$, the transition metal M is preferably at least one of Co, Ni and Mn. For the lithium-transition metal composite oxide, that represented by the formula $Li_xMn_2O_4$ may also be employed.

The above-described cathode active material and the anode active material may be employed as the cathode and the anode in various modes conforming to the cell configuration.

With the coin-shaped cell, the cathode active material is kneaded with a binder and the resulting mass is compression molded to a disc which is used as a cathode. The anode active material, kneaded with an electrically conductive material and a binder and compression-molded to a disc shape, is employed as an anode. For the binder and the electrically conductive material, kneaded with the active material, those used routinely may be employed without limitations.

The cell shape may be cylindrical, square or button-shape, in addition to the coin shape. It is only necessary to adaptively change the mode of the anode and the cathode.

EXAMPLES

The present invention will be hereinafter explained with reference to Examples based upon experimental results.
Construction of Fabricated Cell The coin-shaped cell, fabricated in Examples 1 to 3 and Comparative Examples 1 to 3, is shown in FIG. 1.

This cell is comprised of an disc-shaped upper electrode 1 and a disc-shaped lower electrode 2, contained in an upper electrode can 4 and a lower electrode can 5, respectively, with the cans 4 and 5 being stacked together via a porous separator 3. The electrodes 1 and 2 are impregnated with a liquid electrolyte. The upper and lower electrode cans 4 and 5 are hermetically sealed by being caulked via a sealing gasket 8. The cell has an outer diameter of 20 mm and a height of 2.5 mm.

The composition of the non-aqueous solvent used for the cell is shown in Table 1.

TABLE 1

| solvents | mixing ratio (vol %) | | | |
|---|---|---|---|---|
| | VC | PC | EC | DMC |
| non-aqueous solvent 1 | 50 | 0 | 0 | 50 |
| non-aqueous solvent 2 | 0 | 50 | 0 | 50 |
| non-aqueous solvent 3 | 0 | 0 | 50 | 50 |
| non-aqueous solvent 4 | 100 | 0 | 0 | 0 |
| non-aqueous solvent 5 | 0 | 0 | 100 | 0 |

EXAMPLE 1

The coin-shaped cell having the above-mentioned structure was fabricated using an upper electrode, a lower electrode and a liquid electrolyte defined below. This coin-shaped cell is a secondary cell in which the upper electrode and the lower electrode operate as an anode and a cathode, respectively.

Upper Electrode: Metal lithium punched to a disc shape.

Lower Electrode: A molded product of lithium-transition metal composite oxide produced by mixing 90 parts by weight of $LiCoO_2$, 7 parts by weight of graphite as an electrically conductive material and 3 parts by weight of a fluorine resin as a binder, and by molding the resulting mass under pressure to a disc shape. Meanwhile, $LiCoO_3$ was prepared by mixing lithium carbonate and cobalt carbonate at a molar ratio of 0.5 to 1.0 and sintering the resulting mixture in air for five hours at a temperature of 900° C.

Liquid Electrolyte: $LiPF_6$ dissolved in a non-aqueous solvent at a concentration of 1.0 mol/lit.

COMPARATIVE EXAMPLE 1

A coin-shaped cell was produced in the same way as in Example 1 except using a non-aqueous solvent 2 in place of the non-aqueous solvent 1.

The cycle performance of the coin-shaped cells, produced in Example 1 and Comparative Example 1, was checked.

Figure 2:
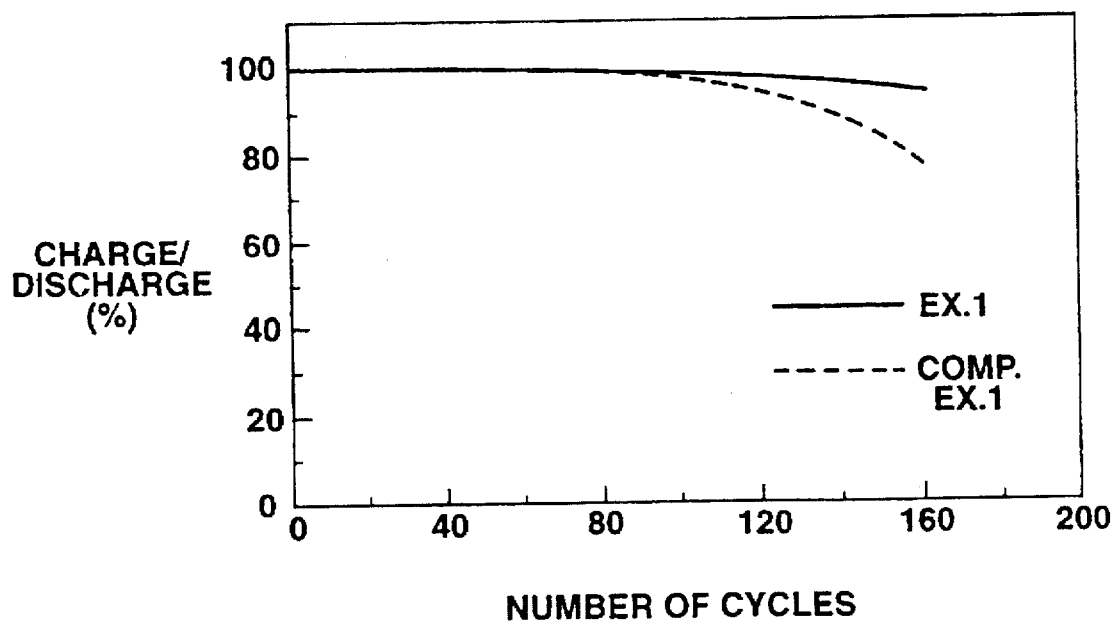
FIG. 2 is a graph showing cyclic characteristics of a coin-shaped cell in which an upper electrode is a molded body of metal lithium and a lower electrode is a mold of a lithium transition metal composite oxide.

The cycle performance was evaluated by repeatedly performing charging and discharging for numbers of cycles. Charging was performed under 1 mA constant current to an upper limit voltage of 4.2 V followed by constant voltage charge at the voltage for a total of 10 hours under conditions of a temperature of 23° C. Then, discharging was performed under 1 mA constant current until the cell reaches a terminal voltage of 3.0 V. The charging and discharging efficiency was calculated for each cycle. FIG. 2 shows the charging/discharging efficiency plotted against the number of cycles.

It is seen from FIG. 2 that, with the cell of Example 1, employing a VC-DMC mixed solvent (non-aqueous solvent 1), the charging/discharging efficiency is less likely to sag than with the cell of the Comparative Example 1 employing a DC-DMC mixed solvent (non-aqueous solvent 2) such that the charging/discharging efficiency of the cell of Example 1 is maintained substantially at its initial value even at the 180th cycle.

It is seen from this that VC is more suitable than PC as the non-aqueous solvent since it is possible with VC to improve cyclic performance of the cell more significantly.

EXAMPLE 2

A coin-shaped cell was fabricated in the same way as in Example 1 except using the lower electrode defined below. With the present cell, the upper electrode is a reference electrode and the lower electrode is an anode evaluating cell formed of an anode active material.

Lower Electrode: A molded article of non-graphatizable carbon material produced by mixing 90 parts by weight of powders of the non-graphatizable carbon material and 10 parts by weight of a fluorine resin as a binder and molding the resulting mixture under pressure to a disc shape.

The non-graphatizable carbon material was generated by introducing, by so-called oxygen cross-linkage, 10 to 20% of oxygen-containing functional groups into a petroleum pitch employed as a starting material, and sintering the resulting mixture in an inert gas stream at a temperature of 1,000° C. This non-graphatizable carbon material has the properties close to those of the vitreous carbon and had the spacing of the (002) plane as measured by the X-ray diffraction method, of 0.376 nm and a true density of 1.58 g/cm³. This non-graphatizable carbon material was pulverized to a mean particle size of 10 μm so as to be used for fabricating the molded product.

COMPARATIVE EXAMPLE 2

A cell for cathode evaluation was fabricated in the same way as in Example 2 except using the non-aqueous solvent 2 in place of the non-aqueous solvent 1.

The cycle performance of the cell for cathode evaluation, produced in Example 2 and Comparative Example 2, was checked.

Figure 3:
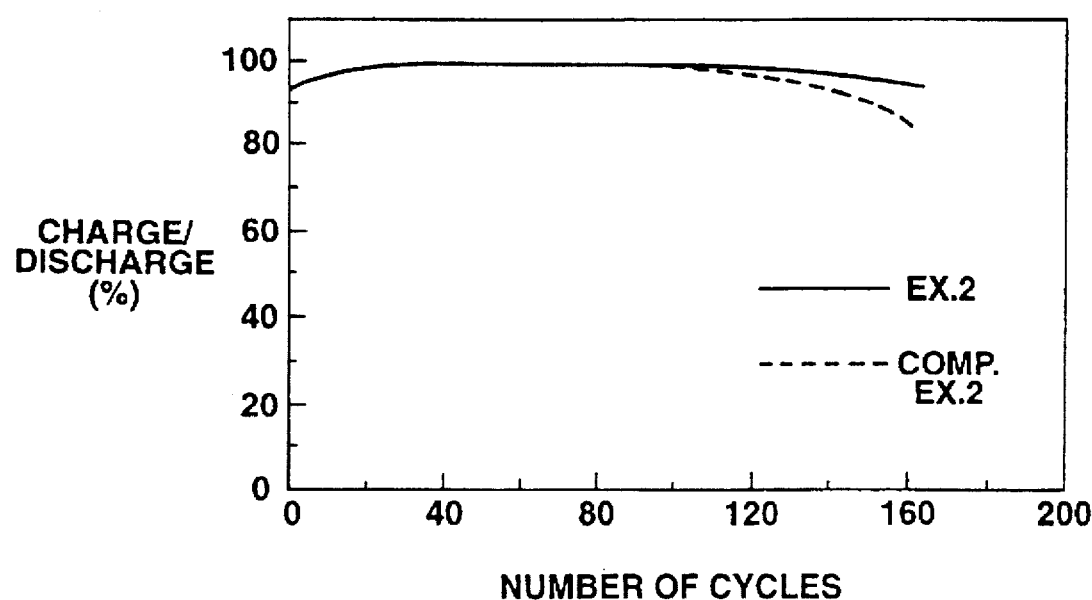
FIG. 3 is a graph showing cyclic characteristics of a cathode evaluation cell in which an upper electrode is a molded body of metal lithium and a lower electrode is a molded body of a non-graphatizable carbon material.

The cycle performance was evaluated by repeatedly performing charging and discharging for numbers of cycles. Charging was performed under 1 mA constant current to a lower limit voltage of 0 V followed by constant current charge at the current for 10 hours under conditions of a temperature of 23° C. Then, discharging was performed under 1 mA constant current until the cell reaches a terminal voltage of 1.5 V. The charging and discharging efficiency was calculated for each cycle. FIG. 3 shows the charging/discharging efficiency plotted against the number of cycles.

It is seen from FIG. 3 that, with the cell of Example 2, employing a VC-DMC mixed solvent (non-aqueous solvent 1), the charging/discharging efficiency is less likely to sag than with the cell of the Comparative Example 2 employing a DC-DMC mixed solvent (non-aqueous solvent 2) such that the charging/discharging efficiency of the cell of Example 2 is maintained substantially at its initial value even at the 180th cycle.

It is seen from this that, even when the non-graphatizable carbon material is used as an active material for a cathode in place of metal lithium, the cyclic performance of the cell may be improved with the use of VC, so that VC is suitable as a non-aqueous solvent.

EXAMPLE 3

A coin-shaped cell was fabricated in the same way as in Example 1 except using the lower electrode defined below. With the present cell, the upper electrode is a reference electrode and the lower electrode is an anode evaluating cell formed of an anode active material.

Lower Electrode: A graphite molded article produced by mixing 90 parts by weight of graphite powders manufactured by RONZA INC. under the trade name of KS-75 and 10 parts by weight of the fluorine resin and molding the resulting mixture under pressure to a disc shape.

The graphite powders employed had the spacing of the (002) plane of 0.3358 nm, a crystallite thickness along the C-axis of 25.4 nm, the G-value in the Raman spectrum of 8.82 and the true density of 2.23 g/cm$^3$, as parameters of the crystalline structure, with the mean particle size being 28.4 μm.

COMPARATIVE EXAMPLE 3

A cell for cathode evaluation was fabricated in the same way as in Example 3 except using the non-aqueous solvent 2 in place of the non-aqueous solvent 1.

The charging/discharging performance of the cell for cathode evaluation, produced in Example 3 and Comparative Example 3, was checked.

The charging/discharging performance was evaluated by performing charging and discharging. Charging was performed under 1 mA constant current to a lower limit voltage of 0 V followed by constant voltage charge at the voltage for 10 hours under conditions of a temperature of 23° C. Then, discharging was performed under 1 mA constant current until the cell reaches a terminal voltage of 1.0 V. Changes in potential in the course of charging and discharging were measured. The changes in potential with lapse of time are shown in FIG. 4.

Figure 4:
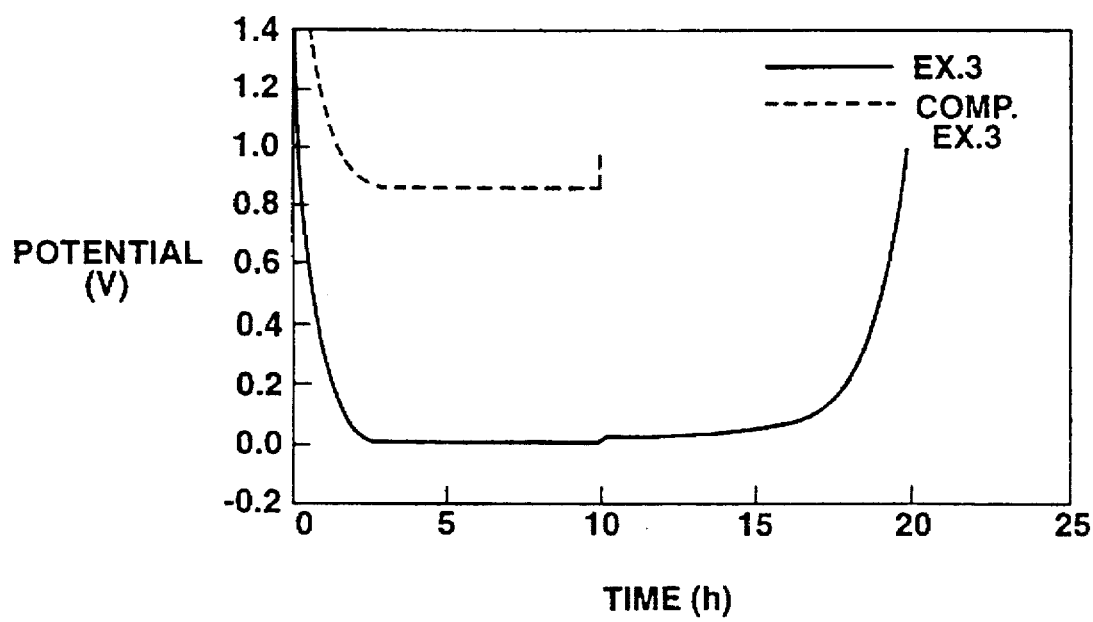
FIG. 4 is a graph showing cyclic characteristics of a cathode evaluation cell in which an upper electrode is a molded body of metal lithium and a lower electrode is a molded body of graphite.

It is seen from FIG. 4 that, with the cell of the Comparative Example 3 employing the mixed solvent of PC and DMC (non-aqueous solvent 2), the electrical potential is not lowered sufficiently during charging, thus indicating that charging/discharging process has not been regular. This is presumably ascribable to the decomposition of PC by graphite.

Conversely, with the cell of Example 3 employing a mixed solvent of VC and DMC (non-aqueous solvent 1), regular potential changes have been noticed for both the charging and discharging processes, thus indicating that the electrodes are functioning as regularly.

It is thus seen that VC is excellent as a non-aqueous solvent since it becomes possible with the use of VC to produce a regular cathode function when the metal lithium, non-graphatizable carbon material or graphite is employed as the cathode active material.

Investigations into Low-Temperature Characteristics of VC

It is seen from the above results that, if VC is contained in the liquid electrolyte, the cathode formed of graphite can function as regularly. It has been reported that, if EC is contained in the liquid electrolyte in place of VC, the graphite cathode can function as regularly. However, EC tends to be solidified under low-temperature environment. In this consideration, the EC containing non-aqueous liquid electrolyte and the VC containing non-aqueous liquid electrolyte were compared to each other as to the states thereof under a low-temperature environment.

Four different liquid electrolytes were prepared by dissolving LiPF$_6$ in the non-aqueous solvents 1, 3, 4 and 5 of Table 1 at a rate of 1.0 mol/liter.

These liquid electrolyte samples were poured into sample vials and allowed to stand for four hours in a constant-temperature vessel maintained at −30° C. or 10° C. for four hours and the states of the liquid electrolyte samples after lapse of four hours were observed. The results are shown in Table 2.

TABLE 2

| | temperature of allowing to stand (°C.) | state at the temperature of allowing to stand |
|---|---|---|
| liquid electrolyte employing non-aqueous solvent 1 | −30 | liquid |
| liquid electrolyte employing non-aqueous solvent 3 | | solid |
| liquid electrolyte employing non-aqueous solvent 4 | 10 | liquid |
| liquid electrolyte employing non-aqueous solvent 5 | | solid |

It is seen from Table 2 that, while the liquid electrolyte employing the VC-containing solvents (non-aqueous solvent 1 or the non-aqueous solvent 4) is not solidified, the liquid electrolyte employing the EC-containing solvent (non-aqueous solvent B or the non-aqueous solvent 5) is solidified on being allowed to stand under a low-temperature environment.

Thus it is seen that the liquid electrolyte employing VC is more meritorious than the liquid electrolyte employing EC in improving low-temperature characteristics of the cell.

Investigations into VC Mixing Ratio

The optimum mixing ratio of VC, mixed into the non-aqueous solvent, was checked.

Coin-shaped cells were fabricated in the same way as in Example 1 except employing the non-aqueous solvents 6 to 13 shown in Table 3 in place of the non-aqueous solvent 1, and the retention of capacity of each cell was evaluated.

TABLE 3

| | mixing ratio (vol %) | |
|---|---|---|
| | VC | DMC |
| non-aqueous solvent 6 | 10 | 90 |
| non-aqueous solvent 7 | 20 | 80 |
| non-aqueous solvent 8 | 30 | 70 |
| non-aqueous solvent 9 | 40 | 60 |
| non-aqueous solvent 10 | 50 | 50 |
| non-aqueous solvent 11 | 60 | 40 |

TABLE 3-continued

| | mixing ratio (vol %) | |
|---|---|---|
| | VC | DMC |
| non-aqueous solvent 12 | 70 | 30 |
| non-aqueous solvent 13 | 80 | 20 |

The retention of capacity was measured in the following manner.

The charging/discharging consisting in charging under a constant current and a constant voltage for ten hours under conditions of a temperature of 23° C. or lower, an upper limit voltage of 4.2 V and a current of 1 mA, followed by discharging under a constant current under conditions of the temperature of 23° C. or −20° C., a current of 1 mA and a terminal voltage of 3.0 V, was carried out repeatedly through 100 cycles. The ratio of the capacity of the second cycle to that of the 100th cycle in the course of the charging/discharging was measured and used as the retention of capacity. The measured results of the retention of capacity are shown in Table 4.

TABLE 4

| non-aqueous solvent used | temperature (°C.) | retention of capacity (%) |
|---|---|---|
| non-aqueous solvent 6 | 23 | 85.6 |
| | −20 | 86.2 |
| non-aqueous solvent 7 | 23 | 91.8 |
| | −20 | 92.6 |
| non-aqueous solvent 8 | 23 | 93.7 |
| | −20 | 94.1 |
| non-aqueous solvent 9 | 23 | 95.0 |
| | −20 | 95.5 |
| non-aqueous solvent 10 | 23 | 92.8 |
| | −20 | 93.2 |
| non-aqueous solvent 11 | 23 | 90.9 |
| | −20 | 91.6 |
| non-aqueous solvent 12 | 23 | 86.4 |
| | −20 | 87.2 |
| non-aqueous solvent 13 | 23 | 84.2 |
| | −20 | 85.0 |

It is seen from Table 4 that a high retention of capacity of not lower than 90% may be achieved with the use of mixed solvents with the VC mixing ratio of 20 to 60 vol % (non-aqueous solvents 7 to 11).

Thus it is seen that the most desirable VC mixing ratio in the non-aqueous solvent is 20 to 60 vol %.

Although DMC was employed herein as a solvent to be mixed into VC, it has been confirmed by experiments that similar results may be achieved with the use of other solvents for VC.

What is claimed is:

1. A non-aqueous liquid electrolyte secondary cell comprising:

an anode comprising a non-graphitizable carbon material intercalating lithium reversibly; a cathode; and a non-aqueous liquid electrolyte comprising an electrolyte dissolved in a non-aqueous solvent, said non-aqueous solvent consisting essentially of vinylene carbonate and a chain ester.

2. The non-aqueous liquid electrolyte secondary cell as claimed in claim 1, wherein the cathode comprises a composite oxide containing lithium and one or more transition metal.

3. The non-aqueous liquid electrolyte secondary cell as claimed in claim 2, wherein the anode carbon material has a spacing of the (002) plane of about 0.376 nm and a true density of about 1.58 g/cm$^3$.

4. The non-aqueous liquid electrolyte secondary cell as claimed in claim 1, wherein the non-aqueous solvent contains vinylene carbonate in an amount of not less than 20 vol % and not more than 60 vol %.

5. The non-aqueous liquid electrolyte secondary cell as claimed in claim 1, wherein the chain ester is at least one selected from the group consisting of dimethyl carbonate, methylethyl carbonate and diethyl carbonate.

* * * * *